United States Patent [19]
Wallace

[11] 3,792,772
[45] Feb. 19, 1974

[54] SEPARATING APPARATUS WITH COMBINED AUGER AND ROTATING DISC FOR DISCHARGING

[75] Inventor: Joseph E. Wallace, Creston, Iowa

[73] Assignee: Vanmark Corporation, Creston, Iowa

[22] Filed: Mar. 1, 1972

[21] Appl. No.: 230,822

[52] U.S. Cl.................. 209/173, 209/465, 209/492
[51] Int. Cl............................................. B03b 3/38
[58] Field of Search ... 209/158, 159, 172, 173, 490, 209/492, 164, 169, 205, 465

[56] References Cited
UNITED STATES PATENTS

| 3,363,757 | 1/1968 | Seymour | 209/158 |
| 3,019,900 | 2/1962 | Lagrost | 209/172 |
| 1,996,547 | 4/1935 | Mason | 209/465 |
| 286,791 | 10/1883 | Dean | 209/159 |

FOREIGN PATENTS OR APPLICATIONS

| 878,918 | 10/1961 | Great Britain | 209/172 |

Primary Examiner—Frank W. Lutter
Assistant Examiner—Ralph J. Hill
Attorney, Agent, or Firm—Henderson & Strom

[57] ABSTRACT

An apparatus for separating heavier objects such as stones from lighter objects such as vegetables is disclosed herein. A vertically oriented conveyor extends into a fluid-containing receiving tank for conveying lighter objects upwardly from the receiving tank, and a passageway from the receiving tank into a collection tank is provided for removal of heavier objects. A rotating disc at the bottom of the receiving tank expels the heavier objects which settle thereon outwardly through the passageway into the collection tank.

Paddle means are disclosed for continuously sweeping the heavier objects from the collection tank and depositing them outside the collection tank.

A chamber is provided at the rear of the vertical conveyor housing for receiving liquid from the conveyor housing and discharging the liquid downwardly toward the passageway between the two tanks to establish fluid circulation contra to the movement of the heavier objects through the passageway.

5 Claims, 6 Drawing Figures

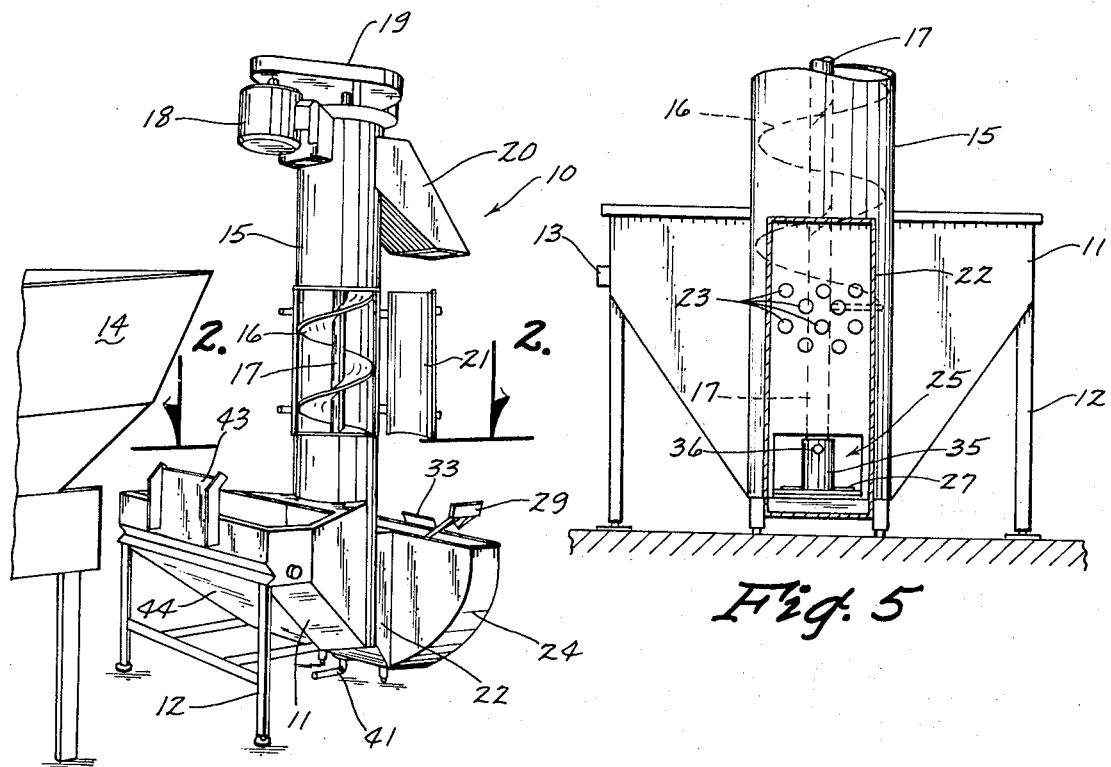
Fig. 5
Fig. 1
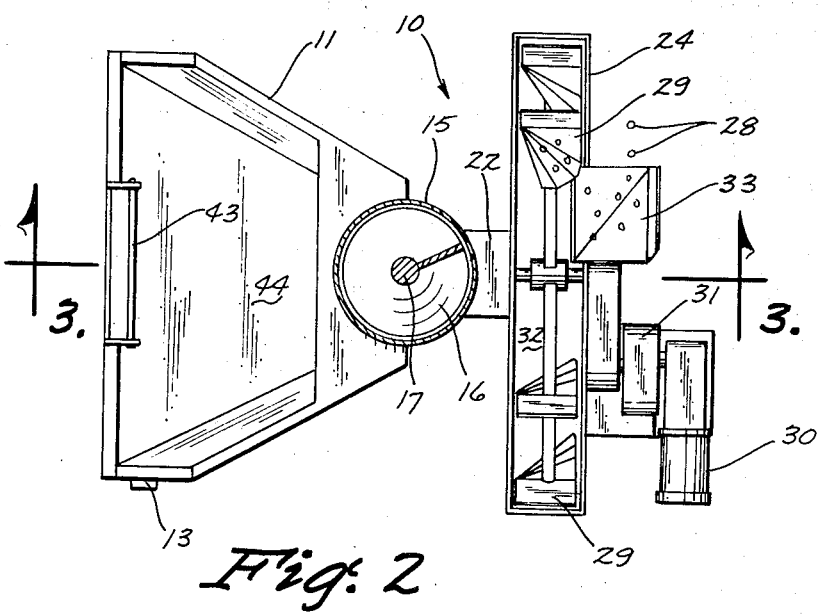
Fig. 2

3,792,772

SEPARATING APPARATUS WITH COMBINED AUGER AND ROTATING DISC FOR DISCHARGING

BACKGROUND OF THE INVENTION

Devices for separating heavier objects such as stones from lighter objects such as vegetables have been known for many years. One of the best of such devices is described in U.S. Pat. No. 3,363,757. The device described therein includes a receiving tank containing a fluid such as water. Potatoes or other vegetables mingled with stones and other debris are fed into the tank and conveyed upwardly by a vertical conveyor including an auger flight extending down into the fluid, all as described in the aforementioned patent. Stones and other heavy debris settle to the bottom of the fluid-containing tank for subsequent removal, and lighter debris such as paper, grass, string, etc. is removed through overflow pipes provided on the tank.

While the separator described above has been generally satisfactory, nevertheless it is subject to certain disadvantages. The greatest disadvantage results from the lack of any means for removing accumulated stones from the tank, so that periodically the apparatus must be shut down and manually cleaned.

There has long been a need for a separating apparatus which is capable of continuously separating stones from potatoes or the like without the need for periodic shutdown and removal of accumulated stones. Such an apparatus is provided by this invention.

SUMMARY OF THE INVENTION

According to this invention, a separating apparatus is provided which does not have to be periodically shut down for removal of accumulated stones.

The apparatus of this invention is particularly suited for receiving vegetables contaminated with heavier objects such as stones and the like, and for separating the vegetables from the stones.

The apparatus includes a receiving tank adapted to hold a fluid such as water at an operational level, and includes a vertically oriented housing enclosing a rotating shaft having an auger flight thereon. The auger extends to below the operational fluid level in the tank, and conveys the produce from the receiving tank upwardly for discharge through an outlet near its upper end.

The receiving tank has an opening at its lower rear providing fluid communication with a collection tank for collecting stones or the like. The stones are expelled from the receiving tank into the collection tank by a rotating disk disposed at the bottom of the receiving tank and adapted to urge the stones toward and through the opening between the two tanks. The collection tank may include means for continuously removing stones.

A chamber is provided at the rear of the conveyor housing, and is in fluid communication with the conveyor housing by means of suitable openings between the two. The chamber is open at its lower end, and provides fluid circulation from the conveyor housing down toward the rotating disc.

It is an object of this invention to provide a separating apparatus for separating stones from vegetables such as potatoes, which apparatus does not require periodic shutdown for cleanout of accumulated stones.

BRIEF DESCRIPTION OF THE DRAWINGS

FIG. 1 is a perspective view illustrating the apparatus of the invention.

FIG. 2 is a cross section taken along the line 2—2 of FIG. 1 showing the receiving tank, collection tank and stone remover in top plan view.

FIG. 5 is a cross section taken along the line 5—5 of FIG. 3.

DESCRIPTION OF THE PREFERRED EMBODIMENT

Figure 3:
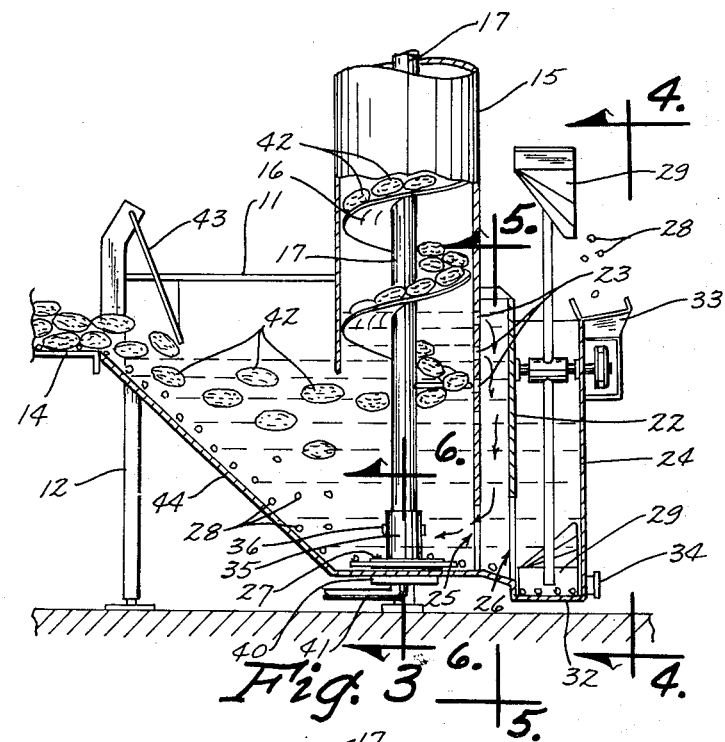
FIG. 3 is a cross section taken along the line 3—3 of FIG. 2, illustrating the operation of the apparatus in separating stones from produce and removing the stones.

The preferred embodiment of the invention will now be described in detail by reference to the drawings.

In FIG. 1, the overall apparatus of the invention is illustrated generally at 10, and includes a receiving tank 11 supported by a framework 12 for receiving material such as potatoes mingled with stones and other debris from a discharge hopper 14. The receiving tank 11 can be seen (FIGS. 1 and 3) to converge from a larger horizontal cross section to a smaller horizontal cross section from top to bottom to facilitate movement of material and to prevent material from packing up in dead spots within the tank as would occur without the converging shape of receiving tank 11. An overflow outlet 13 is provided on the receiving tank 11 to maintain a selected level in the tank, and to allow removal of light extraneous material such as dirt, leaves, twigs and the like.

A vertical housing 15 extends upwardly from within the rearward portion of the receiving tank 11, and encloses an auger flight 16 mounted on auger shaft 17. The shaft 17 is rotated by motor 18 acting through a power transmission means 19 at the top of housing 15. An outlet chute 20 is provided near the upper end of vertical housing 15 for directing potatoes or other vegetables, from which stones and other debris have been separated, to further processing. The vertical housing is also provided with a hinged door 21 to facilitate inspection and cleanout of the interior of the vertical housing 15.

A chamber 22 is provided at the lower rear of the vertical housing 15, and a plurality of openings 23 (FIGS. 1 and 5) are formed in the lower rear portion of vertical housing 15 to provide fluid communication between the vertical housing 15 and the chamber 22 for a purpose to be explained below.

A collection tank 24 is mounted to the rear of chamber 22. A fluid passageway between receiving tank 11 and collection tank 24 is provided by opening 25 at the lower rear of receiving tank 11 and opening 26 at the lower rear of chamber 22. This is best illustrated in FIGS. 3 and 4.

Figure 4:
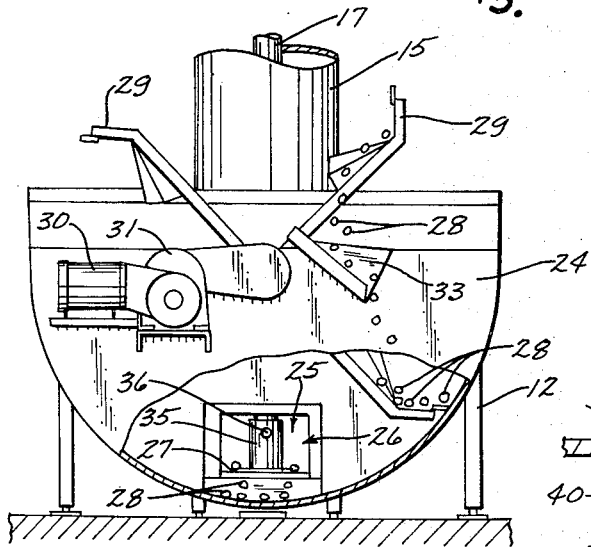
FIG. 4 is a rear elevation, partially cut away, taken along the line 4—4 of FIG. 3.

A disc 27 is attached to the lower end of auger shaft 17 for rotation therewith, and as shown in FIGS. 3 and 4, stones 28 settle to the upper surface of disc 27 and are expelled by centrifugal force through openings 25 and 26 into collection tank 24.

The stones 28 are continuously removed from collection tank 24 by a plurality of formed paddles 29 rotatably mounted within collection tank 24. The paddles 29 are rotated by a motor 30 mounted on the tank 24 and acting through a torque limiting sprocket 31. The paddles 29 sweep over the upper surface of arcuate bottom member 32 of collection tank 24 as best seen in FIG. 4. The stones 28 fall from the paddles 29 by gravity onto a chute or pan 33 which is shaped (FIGS. 3 and 4) to divert the falling stones to a point outside of collection tank 24. The paddles 29 preferably have perforations (not shown) formed therein to minimize turbulence in the collection tank. A drain 34 (FIG. 3) is provided at the back of collection tank 24, and both receiving tank 11 and collection tank 24 can be drained thereby as is apparent in FIG. 3.

Figure 6:
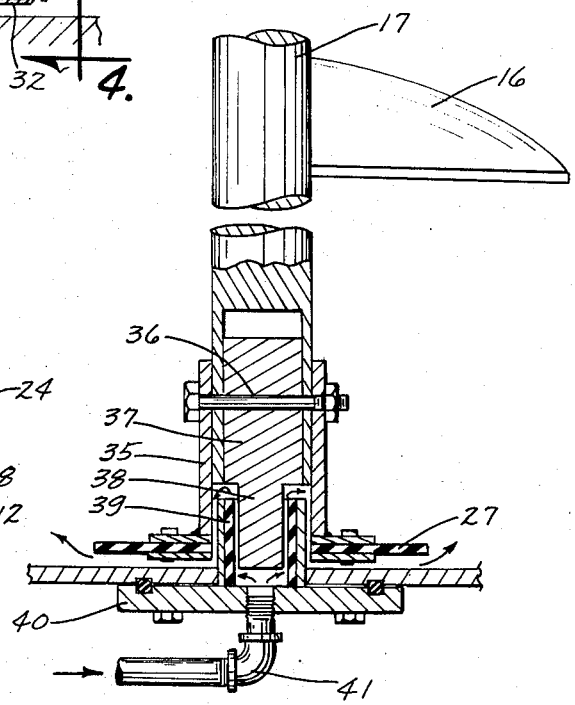
FIG. 6 is an enlarged cross-section of the bearing and disc assembly taken along the line 6—6 of FIG. 3.

The preferred manner of attaching disc 27 to auger shaft 17 is illustrated in FIG. 6. A hub 35 extends upwardly from disc 27 over the lower end of auger shaft 17, to which it is rigidly connected by bolt 36 extending therethrough. The lower end of auger shaft 17 is shown bored out, and a stub shaft 37 inserted therein. The stub shaft 37 has a necked down portion 38 extending into cylindrical extension 39 projecting upwardly from bottom plate 40 attached to the bottom of receiving tank 11. The necked down portion 38 of stub shaft 37 serves as a bearing within extension 39, and is water lubricated by water introduced through inlet 41 extending through bottom plate 40. The auger shaft 17 is supported from the top, so that no axial load is imposed at the bottom of the shaft. The necked down portion 38 of the stub shaft and the extension 39 serve primarily as a centering means, and are not subjected to any heavy loads. The small amount of water injected through inlet 41 is removed partly through receiving tank overflow 13, and partly by the water adhering to the vegetables lifted up by auger flight 16.

An example of the operation of the illustrated embodiment of the apparatus will now be described.

Potatoes 42 contaminated with stones 28 are introduced into receiving tank 11 from a discharge hopper 14 through a hinged gate 43 as best seen in FIG. 3. The stones 28, being of considerably higher density than the potatoes 42, settle rapidly to the inclined surface 44 of receiving tank 11. The stones 28 soon settle to the upper surface of disc 27 which is rotating with auger shaft 17. The rotation of disc 27 expels the stones outward through openings 25 and 26 into collection tank 24, where they are swept up by paddles 29 and subsequently deposited on chute 33 directed outwardly from collection tank 24. Note that the shape of the paddles 29 is such that stones carried thereby are diverted to the outside of the tank 24 by gravity upon rotation of the paddles as shown best in FIGS. 3 and 4. The falling stones are directed by chute 33 to a suitable conveyor (not shown) or otherwise disposed of. Note that the upper surface of the arcuate bottom member 32 of collection tank 24 is slightly below the opening 26 (FIG. 3) to avoid pinching of stones by the paddles 29 at the edge of opening 26. Also, the lower surface of the passageway slants downwardly toward the collection tank so that gravity assists in stone removal from the passageway to the collection tank.

Returning to FIG. 3, the potatoes 42, which are of slightly greater density than water, settle slowly in receiving tank 11. However, due to the operation of water circulating between housing 15 and chamber 22 through openings 23 as shown by the arrows in FIG. 3 the potatoes are directed onto the auger flight 16 for elevation to the outlet chute 20 at the top thereof. The action of the auger flight 16 lifts the water level in the housing 15 to above the level of water in tank 11. This elevated water in turn passes down through chamber 22 and forwardly over disc 27 and then back up to auger flight 16 as indicated by the arrows in FIG. 3. This water circulation also aids in keeping potatoes off the disc 27 such that they are not expelled to the collection tank 24.

The above description of the preferred embodiment of the invention, including the operation thereof, describes a system for separating potatoes from stones, including elevating the potatoes for further processing steps, which system can operate continuously without the necessity of periodic shutdown for removal of accumulated stones as was necessary with prior art equipment.

It will be apparent that numerous modifications and variations of the illustrated embodiment could be utilized without departing from the invention, which is to be defined by the appended claims.

I claim:

1. A separating apparatus comprising:
    a first tank for containing fluid at an operational level;
    a vertically oriented housing enclosing a rotatable shaft having an auger flight affixed thereto, the housing having a discharge opening near its upper end and an open lower end extending into the first tank and being rigidly connected to the first tank, the auger flight extending to slightly below the operational fluid level in the first tank;
    a second tank in fluid communication with the first tank, the fluid communication being provided by a passageway extending from the lower portion of the first tank into the second tank;
    a chamber affixed to the lower rearward wall of the housing, the lower rear portion of the housing having fluid communication means extending into the upper part of the chamber, and the chamber having an opening at its lower portion adapted to discharge fluid downwardly toward the passageway between the first and second tanks; and
    means adjacent the lower surface of the first tank adapted to expel material settling thereon outwardly into the second tank.

2. The separating apparatus of claim 1 wherein the means adapted to expel material is a disc connected to the lower end of the rotatable shaft and rotatable therewith.

3. The separating apparatus of claim 1 wherein the second tank has an arcuate bottom member and includes means movable over the upper side of said arcuate bottom member in proximity thereto, such means being adapted to sweep objects from the arcuate bottom member and expel them from the second tank.

4. The separating apparatus of claim 3 wherein the lower surface of the passageway between the first and second tanks slants downwardly to an outlet slightly above the upper side of the arcuate bottom member of the second tank along the extent of the passageway.

5. The separating apparatus of claim 4 wherein the means adapted to sweep objects from the arcuate bottom member includes a plurality of rotating paddles shaped to lift objects from the bottom member and upon further rotation to deposit the objects onto a discharge chute.

* * * * *